United States Patent [19]

Matthews

[11] Patent Number: 4,794,388

[45] Date of Patent: Dec. 27, 1988

[54] METHOD OF AND APPARATUS FOR CONTROLLING A DISPLAY

[75] Inventor: Henry G. Matthews, Cobalt, Conn.

[73] Assignee: Summagraphics Corporation, Fairfield, Conn.

[21] Appl. No.: 348,518

[22] Filed: Feb. 12, 1982

Related U.S. Application Data

[63] Continuation of Ser. No. 125,955, Feb. 20, 1980, abandoned.

[51] Int. Cl.$^4$ ............................................... G09G 1/16
[52] U.S. Cl. ..................................... 340/731; 340/709; 340/365 R
[58] Field of Search ........ 340/709, 739, 740, 365 RA, 340/706, 365 E, 731; 178/18–20; 273/DIG. 28; 200/6 A; 358/22, 183

[56] References Cited

U.S. PATENT DOCUMENTS

| | | | |
|---|---|---|---|
| 3,345,610 | 10/1967 | Wolf | 340/365 E |
| 4,197,590 | 4/1980 | Sukonick et al. | 340/731 |
| 4,245,137 | 1/1981 | Hirai et al. | 200/6 A |
| 4,245,244 | 1/1981 | Livewski et al. | 358/183 |

*Primary Examiner*—Marshall M. Curtis
*Attorney, Agent, or Firm*—Rosen, Dainow & Jacobs

[57] ABSTRACT

Information presented on a visual display is varied in content and size through the use of a single operator-manipulated input device. The foregoing is accomplished through the use of a novel command signal generator which includes a pivotally mounted rotatable shaft, high-resistance switches operatively associated with the shaft and logic circuitry responsive to command signals provided by the switches and by shaft rotation sensors for generating display control signals.

36 Claims, 3 Drawing Sheets

METHOD OF AND APPARATUS FOR CONTROLLING A DISPLAY

This is a continuation of application Ser. No. 125,955, filed Feb. 20, 1980, now abandoned.

BACKGROUND OF THE INVENTION

(1) Field of the Invention

The present invention relates to the displaying of information and particularly to the exercise of control over the size and content of a data display. More specifically, the present invention is directed to controllable display devices and to display manipulation control signal generators for use in such devices. Accordingly, the general objects of the present invention are to provide novel and improved methods and apparatus of such character.

(2) Description of the Prior Art

While all of the inventive aspects of the present invention are not limited to use in association with the display of data, the present invention is particularly well suited for use in and as a manipulatable information display. Accordingly, the invention will be discussed below in connection with the displaying of serially sensed information and particularly with respect to the manipulation of active visual displays.

The electronic display of graphical information, including information of the type which could conveniently be recorded by a pen on a moving chart, customarily involves the use of a cathode ray tube (CRT). As is well known, a CRT display will generate a visual spot at cartesian coordinance location x,y in response to corresponding voltage inputs of amplitudes x,y. To generate a graphical display, inputted voltage amplitudes x and y are varied to produce a visual image as defined by a plurality of serially generated spots or points. Thus, when the y input signal amplitude is varied linearly in time from $y_{min}$ to $y_{max}$ and the x input signal amplitude varies in an unknown manner between $x_{min}$ and $x_{max}$, a trace will be produced with the changes in x input signal amplitude which occur during the time period between occurrence of the minimum and maximum y amplitude input signals. This generated trace will comprise a visually observable graphical display.

Continuing with the above discussion, by exercising control over the timing of the y input signal amplitude variation and suitably amplifying the x input signal amplitude, selected portions of the changes in the x input signal may be studied.

In the generation of a graphic display, as briefly described above, he laboratory equipment employed is commonly termed an oscilloscope when the x input signal is derived directly from a device or system under test. When the x input signal is generated electronically, particularly from stored data or patterns, the instrument which generates the graphic display is commonly termed a display or a display terminal. In either case, the prior art devices for generating graphics displays have possessed certain inherent deficiencies. These deficiencies will be described in more detail below in a discussion of prior art devices of the "display" type.

If data representing the amplitude of the x input signal is stored sequentially in a random access memory, the stored amplitude value at any point may be obtained by providing the address of that point at the address inputs of the memory. By converting the amplitude value at the addressed memory location to a voltage directly proportional to its value, an output voltage which may be displayed on a CRT will be provided. Addressing the memory sequentially will, of course, produce an output voltage which varies according to the sequentially stored data values. This output voltage may be used as the x input signal of varying amplitude to a display which also receives a y input signal which is changed in amplitude at each new sequential memory address. Thus, in the manner described briefly above, these x and y input signals will generate a graphic presentation of the data stored.

Given random access to the memory, it follows that all or any portion of the stored data may be displayed by selecting the memory addresses generated while the y input signal amplitude is varied. For example, if data is stored sequentially in 4096 memory locations, addressing locations 1 through 4096 in sequence to generate the x input signal while linearly changing the y input signal from $y_{min}$ to $y_{max}$ will provide a graphic presentation of all of the data in the 4096 memory locations. However, addressing memory locations 2049 through 4096 during the $y_{min}$ to $y_{max}$ amplitude transition will result in only the last half of the stored data being presented on the same display area formally occupied by all 4096 locations. Accordingly, amplitude variations in the last half of the stored data have been "expanded" by a factor of 2 on the display at the expense of losing the first half of the stored data from view. This is functionally analogous to the use of the ZOOM lens on a camera where details are expanded at the expense of the field of vision.

Continuing to discuss the camera analogy, moving the camera and its lens allows the user to SCAN the field of vision. Similarly, incrementing or decrementing the starting address location of the memory, while maintaining the same number of addresses accessed during the y amplitude transition, will SCAN the display through the data stored in the memory.

The stored x amplitude data values can range from $x_{min}$ to $x_{max}$. Conversion of the digital signal commensurate with $x_{max}$ to an output voltage proportional thereto will result in generation of an image of maximum size. Some of the smaller stored data values, however, may be too small to be seen conveniently. By converting the stored data values to an output data range greater than that commensurate with $x_{min}$ to $x_{max}$, all values will be displayed proportionally larger with the loss from view of those values exceeding the input x amplitude range; i.e., the RANGE or scale may be varied to enhance the readability of comparatively small stored data values.

The three above-discussed graphics manipulation functions; i.e., ZOOM, SCAN, and RANGE; may be implemented in a display by appropriate manipulation of data memory addressing and the data-to-voltage conversion. Prior to the present invention, displays have customarily treated these functions individually with separate controls. Thus, while attempting to examine the stored data as presented on prior art displays, the operator has been required to avert his attention in order to determine, locate and actuate the controls to cause desired changes in the display. Furthermore, the operator responses which have been required in the prior art in order to exercise control over the ZOOM, SCAN and RANGE functions of a display have had no correspondence with the resultant graphics change sought by the operator. Both of these disabilities of prior displays have greatly impeded their usefulness.

SUMMARY OF THE INVENTION

The present invention overcomes the above-briefly discussed and other deficiencies and disadvantages of the prior art by providing a novel and improved technique for the display of stored data and for the manipulation of the displayed data so as to implement the functions of ZOOM, SCAN and RANGE. The present invention also encompasses apparatus for use in the practice of such novel methods and particularly to a unique display wherein the requisite data function manipulation command signals are generated with a single hand-operated control. This invention is additionally directed to a unique device for providing signals which control various parameters of a visual data display. Additional novel features of the present invention are a "gimbal" mounting means for the aforementioned control signal generator and a high resistance switch for use therein.

Apparatus in accordance with the present invention includes a single operator-manipulated input device which, when moved in a direction which corresponds to a desired change in the visual display, will cause generation of a control signal which will produce that change in the display. In accordance with a preferred embodiment, the operator's control is mounted on a shaft and the shaft is supported such that the control may be moved generally radially with respect to the shaft axis when in a neutral position. Means are provided for sensing movement in four directions and generating command signals commensurate therewith. Also in accordance with the preferred embodiment, the shaft on which the operator's control is mounted may be rotated and the rotation sensed to generate additional display control command signals.

In accordance with another feature of a preferred embodiment of the present invention, the aforementioned shaft is affixed at the end disposed away from the operator's control to a unique gimbal mounting. This "gimbal" mounting comprises a sheet of resilient plastic material which will flex in response to an operator applied force to the control. The sheet material is characterized by sufficient resiliency so as to return the shaft to its neutral position when the applied force is removed.

A further unique feature of a preferred embodiment of the present invention consists of the use of switches which are responsive to movements of the control shaft for generating display manipulation command signals. These switches may include relatively sliding contacts and logic circuitry which changes state in response to the establishment of a high resistance path to a terminal of a bias voltage source to thereby generate the requisite command signals.

A display in accordance with the present invention includes "range" and "zoom" counters which are incremented and decremented in response to the enclosure of individual switches of switch pairs associated therewith; the switches of these pairs being respectively actuated in response to movements in opposite directions of a pivotal input shaft. The state of the "range" counter is employed to control the gain of a digital to analog convertor through which the data to be displayed is converted from digital to analog form. The state of the "zoom" counter is employed to control the quantity of data to be displayed at any one time. Also in accordance with the disclosed embodiment, the input shaft is rotatable and means are provided for sensing both the direction and degree of rotation and for generating signals indicative of a desire to scan data which is available for display and the direction in which such data should be scanned. These signals indicative of the desire to scan and the scan direction are combined with the output of the "zoom" counter and timing signals to select the particular data of that available which will be displayed through controlling the data which is sequentially supplied to the digital to analog convertor.

BRIEF DESCRIPTION OF THE DRAWING

The present invention may be better understood and its numerous objects and advantages will become apparent to those skilled in the art by reference to the accompanying drawings wherein like reference numerals refer to like elements in the several Figures and in which.

DESCRIPTION OF THE PREFERRED EMBODIMENT

Figure 1:
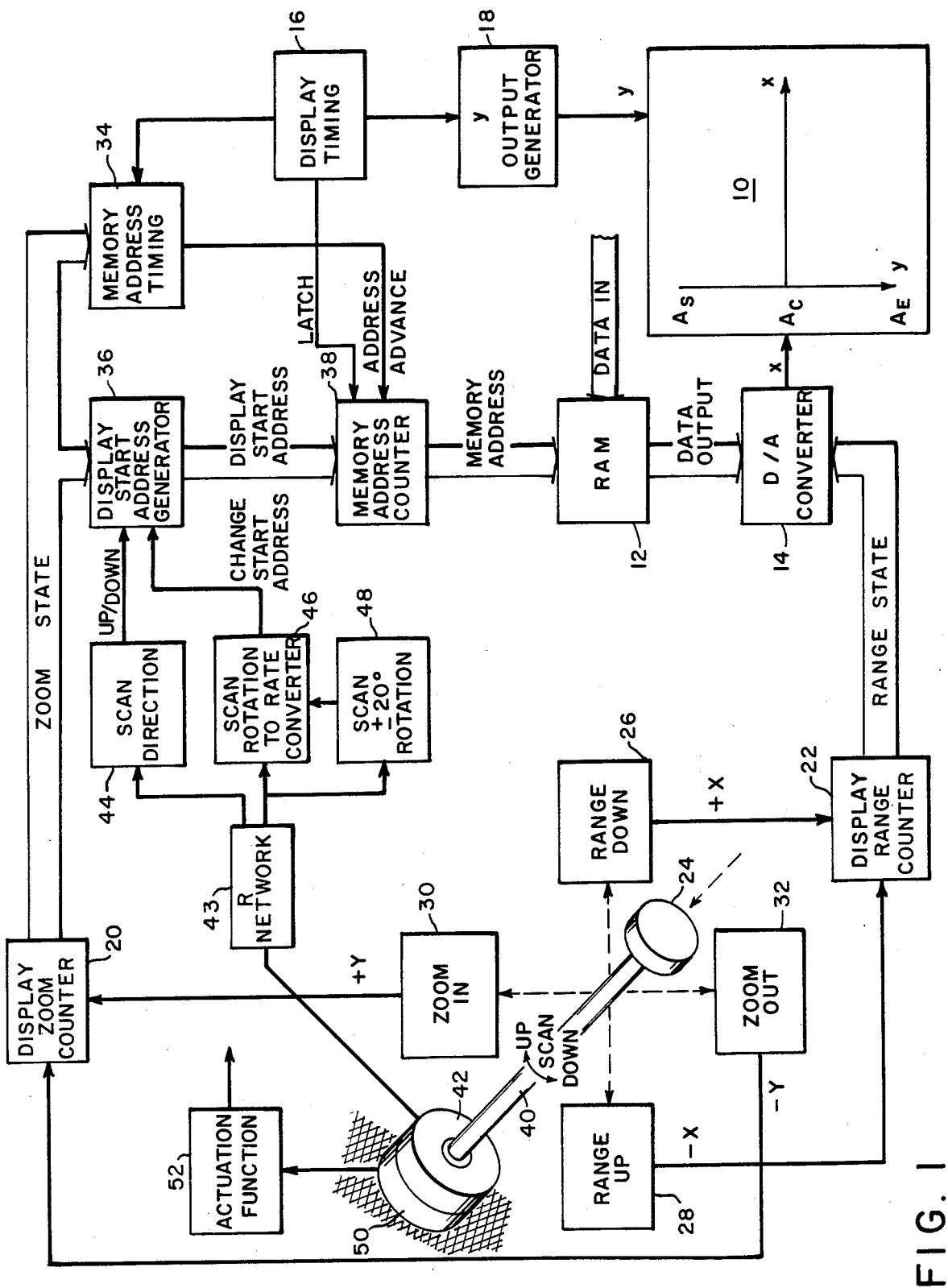
FIG. 1 is a functional block diagram of a display in accordance with a preferred embodiment of the present invention.

Referring to FIG. 1, a display, which may be a conventional CRT, is indicated at 10. The information which is to be presented on display 10 for visual examination either has been or is in the process of being loaded into a random access memory 12 where it is stored in digital form. The means for sensing the information to be displayed and, if necessary, converting such information into digital form for storage does not comprise part of the present invention and will not be described herein. The information to be displayed is outputted from memory 12, converted to analog form by means of a digital to analog convertor 14 and the thus generated analog signal is applied as the x input to display 10. The y input to display 10, which in the customary manner will be a voltage which varies linearly with time between the $y_{min}$ and $y_{max}$ values, is derived from a display timing signal generator 16 with the actual ramp voltage being produced by a sweep voltage generator 18 in response to timing pulses from the display timing signal generator 16.

The three graphics functions ZOOM, SCAN and RANGE, plus a fourth function which will be described below, are combined in a single control in accordance with the present invention. This control modifies, in the manner to be described, the memory address and the data-to-voltage conversion. For purposes of explanation, it will be assumed that the time for the $y_{min}$ to $y_{max}$ linear transition is held constant; i.e., that the slope of the output signal from generator 18 does not vary. It will also be presumed that a maximum of 4096 memory locations may be displayed on display 10 at any one time. The actual number of memory locations which are displayed will be a function of the state of a "DISPLAY ZOOM" counter 20 while the RANGE condition will be a function of the instantaneous state of a "DISPLAY RANGE" counter 22. The manner in which the state of counters 20 and 22 is varied, and the command functions exercised by the counter outputs, will be described below. The correlation between the states of counters 20 and 22 and the ZOOM and RANGE conditions respectively is as follows:

| ZOOM COUNTER 20 STATE | No. OF MEMORY LOCATIONS DISPLAYED |
| --- | --- |
| 0 | 4,096 |
| 1 | 2,048 |
| 2 | 1,024 |
| 3 | 512 |
| 4 | 256 |
| 5 | 128 |
| 6 | 64 |

| RANGE COUNTER 22 STATE | FULL SCALE AMPLITUDE DISPLAYED |
| --- | --- |
| 0 | 100,000 |
| 1 | 50,000 |
| 2 | 20,000 |
| 3 | 10,000 |
| 4 | 5,000 |
| 5 | 2,000 |
| 6 | 1,000 |
| 7 | 500 |
| 8 | 200 |
| 9 | 100 |
| 10 | 50 |
| 11 | 20 |

Counters 20 and 22 are incremented or decremented in response to signals generated through the closure of switches actuated through movement of a single control knob 24 in the direction corresponding to the desired display response. For example, moving knob 24 to the right, the +x direction, actuates a "RANGE DOWN" switch 26 which decrements the RANGE counter 22 one step down. Conversely, moving control knob 24 to the left, the (−)x direction, actuates a "RANGE UP" switch 28 thereby causing RANGE counter 22 to be incremented by one step. With data amplitude displayed horizontally and increasing from left to right, decrementing counter 22 by one step will cause the displayed amplitude data to increase proportionally in size to the right. Thus, movement of control knob 24 to the right will cause the amplitude of the displayed data to increase proportionally in size to the right. The opposite result will, of course, be obtained by moving control knob 24 to the left. Switches 26 and 28 will be further described below in the description of FIGS. 2 through 5. The "DISPLAY RANGE" counter 22 may comprise flip-flops, single shot multivibrators and an up/down counter. The flip-flops are set and reset as a function of the state of switches 26 and 28 while the counter is responsive to the leading edge of the multivibrator generated pulses.

The convertor 14 may comprise a digital-to-analog convertor with programmable gain; convertor 14 being programmed by the number in counter 22. Thus, changing the number in counter 22 will vary the full scale amplitude of the display.

Movement of control knob 24 in the forward direction; i.e., away from the operator; will actuate the "ZOOM IN" switch 30. When actuated, switch 30 provides a signal to "DISPLAY ZOOM" counter 20 which increments counter 20 one step up. As indicated by the tabular information set forth above, incrementing counter 20 one step up will cause the number of memory locations being addressed to be reduced by one half thereby doubling the vertical size of the characteristic of the data being displayed. Restated, moving control knob 24 away from the operator causes the amount of data being displayed along the vertical display axis to be halved whereby the vertical size of the data being displayed is doubled corresponding to the movement of control 24. The opposite action will occur upon movement of the control knob 24 toward the operator to thereby actuate "ZOOM OUT" switch 32 and decrement counter 20. The switches 30 and 32 will customarily be identical to switches 26 and 28. The "DISPLAY ZOOM" counter 20, although typically of smaller capacity, may be identical to "DISPLAY RANGE" counter 22.

The number appearing in "DISPLAY ZOOM" counter 20 will in part control the addressing of memory 12. In the embodiment being described, the output of counter 20 is applied as an input to memory address timing control circuitry 34 as well as to a display start address generator 36. The memory address timing control circuit 34 also receives timing pulses from the display timing generator 16 to synchronize the addressing of the data in the memory 12 with the y input transition. The memory address timing control circuit 34 may, for example, comprise a binary divider programmed by the number in counter 20. The memory address timing control circuit 34 provides address advance pulses to memory address counter 38. The start address, $A_S$, of the data to be displayed is "jammed" into counter 38 by a "latch" signal from display timing circuit 16 prior to initiation of delivery of the address advance signals. The manner in which the display start address is generated will be described below. Address counter 38 may, for example, comprise a presettable up counter. Since the ZOOM control function expands or contracts the display from the center, manipulation of control knob 24 either toward or away from the operator will not vary the memory location of the data value displayed half way down the vertical y axis ($A_C$). However, the memory address of the first location to be displayed, $A_S$, will change relative to $A_C$ as the number in counter 20 is changed. Thus, by way of example, with a memory size of 4096 data values, and with memory location 2048 being $A_C$, the center of the display, the $A_S$ address where the display starts is as follows.

| ZOOM COUNTER STATE | NUMBER OF MEMORY LOCATIONS DISPLAYED | DISPLAY MEMORY ADDRESS | | | START TO CENTER ($A_C$-$A_S$) |
| --- | --- | --- | --- | --- | --- |
| | | START ($A_S$) | CENTER ($A_C$) | END ($A_E$) | |
| 0 | 4,096 | 0(first) | 2,048 | 4,095(last) | 2,048 |
| 1 | 2,048 | 1,024 | 2,048 | 3,071 | 1,024 |
| 2 | 1,024 | 1,536 | 2,048 | 2,559 | 512 |
| 3 | 512 | 1,792 | 2,048 | 2,303 | 256 |
| 4 | 256 | 1,920 | 2,048 | 2,175 | 128 |

| ZOOM COUNTER STATE | NUMBER OF MEMORY LOCATIONS DISPLAYED | DISPLAY MEMORY ADDRESS | | | START TO CENTER ($A_C$-$A_S$) |
|---|---|---|---|---|---|
| | | START ($A_S$) | CENTER ($A_C$) | END ($A_E$) | |
| 5 | 128 | 1,984 | 2,048 | 2,111 | 64 |
| 6 | 64 | 2,016 | 2,048 | 2,079 | 32 |
| 7 | 32 | 2,032 | 2,048 | 2,063 | 16 |

To summarize the ZOOM function control, since the $y_{min}$ to $y_{max}$ transition time has, for the example being described, been established as constant, the DISPLAY ZOOM counter 20 programs the timing of memory addressing via the address timing circuit 34 to sequentially address the memory so as to provide data values to the display at a rate compatible with the ZOOM condition selected. Thus, with DISPLAY ZOOM counter 20 at state 4, the display address timing function generated by memory address timing circuit 34 will cause the memory address counter 38 to be advanced through 256 addresses during the y transition time and these 256 addresses will start at an address $A_S$ which has been delivered to counter 38 from address generator 36 prior to the initiation of delivery of address advance pulses to counter 38 from timing circuit 34.

In the embodiment of FIG. 1, the operator may also "SCAN" the display up or down along the vertical axis y at continuously variable rates by exercising control over the display start address $A_S$ provided by address generator 36. The manner in which the display start address is generated will be described in greater detail below. Briefly, address generator 36 generates the starting address for the display by keeping track of the address at the center of the display, $A_C$, and performing an $A_C$-$A_S$ calculation for the ZOOM state commanded by counter 20.

The SCAN function in the embodiment of FIG. 1 is controlled through rotation of the control knob 24 from its rotational center. The direction of rotation is sensed to specify the SCAN direction with clockwise rotation moving the display upwardly and counterclockwise rotation moving the display downwardly. The degree of rotation of knob 24 is also sensed and is employed to generate a signal commensurate with the desired SCAN rate in the selected direction. In the disclosed embodiment, the control knob 24 is mechanically coupled by a rotatable shaft 40 to a potentiometer 42. Potentiometer 42 is connected in a resistive network 43 through which it is coupled to a dc source, not shown. The manner in which potentiometer 42 is connected in network 43 is such that the voltage on the wiper arm of the potentiometer increases exponentially with rotation of the wiper arm in either direction from the center position. This exponential voltage is delivered as the input signal to a pair of function generators 46 and 48. Additionally, current flow in one leg of the potentiometer may be sensed to indicate rotation in that direction. Accordingly, resistive network 43 provides a second output signal, commensurate with direction of rotation, which is delivered as the input to a SCAN DIRECTION function generator 44.

The SCAN DIRECTION function generator 44 may, for example, comprise a voltage comparator which, through comparison of the input signal thereto with a reference, provides a binary output signal commensurate with the direction of rotation of the control knob 24 and potentiometer shaft 40. This binary output signal is delivered as a further input to the address generator 36.

As noted, the voltage appearing on the wiper arm of potentiometer 43 is applied to function generators 46 and 48. The function generator 46, which in a preferred embodiment comprises a voltage-to-frequency convertor, provides an output pulse rate which varies exponentially thereby giving the operator convenient control over SCAN rate and display positioning.

Function generator 48 is employed to sense when control knob 24 has been rotated 20° or more in either the clockwise or counterclockwise direction from center. Thus, the function generator 48 may also comprise a voltage comparator which compares the voltage appearing on the wiper arm of potentiometer 42 with a reference level corresponding to the +/− 20° of rotation from center. Function generator 48 will also provide a binary output signal. The "SCAN +/− 20° ROTATION" circuit 48 performs two separate functions. Firstly, when control knob 24 is rotated less than +/− 20° from center, the output of circuit 48 inhibits any output from the voltage-to-frequency convertor of SCAN ROTATION TO RATE CONVERTOR 46 thereby preventing unintentional display scanning while the user is exercising the other control functions; i.e., ZOOM and RANGE. When control knob 24 is rotated past 20° in either direction, circuit 48 will enable the output of convertor 46. Thus, when the 20° rotation point is passed, convertor 46 will provide a single pulse to start address generator 36 to thereby SCAN the display up or down by precisely one data memory address location. Continued rotation of control knob 24 past the 20° point will result in the delivery of address change command pulses from convertor 46 to generator 36 at a rate which is commensurate with the degree of rotation whereby the display may be "scrolled" by the operator at varying rates.

The DISPLAY ADDRESS GENERATOR 36 will comprise a register which may add or subtract under the control of the output of SCAN DIRECTION function generator 44. The address generator 36 will be set to a preselected $A_C$ upon application of power and, as noted, generator 36 will perform a subtraction function so that a start address commensurate with the state of display ZOOM counter 20 will be generated. The $A_S$ address will thereafter be varied as a function of the state of counter 20 and the pulses received from convertor 46.

The disclosed embodiment of the present invention employs a further function control associated with control knob 24. This further function generator is embodied in a push type switch 50 which is operated by shaft 40. The state of switch 50 is sensed by an actuation function signal generator 52. Thus, by tapping on control knob 24, the operator may arm a circuit which causes the data display to be visually intensified at those data values which are scanned forward past a horizontal line generated across the center of the display commensurate with the data from $A_C$, the memory address currently occupying the center of the display. Another tap on knob 24 will disable the intensification function. In operation, the armed actuation function causes a specific data word to be written into the memory location currently residing at the $A_C$ location; this data occupying memory bits not required for the storage of the data value. Thereafter, by means which are not disclosed herein, the presence of the specific data word may be detected and such detection will institute the performance of desired tasks on the data stored at the $A_C$ location. It is possible to use the actuation function control, comprising switch 50 and function generator 52, to mark any data value or values desired. In the example being described, the marked memory locations cause the display to generate the data amplitude x value brighter than those not marked to allow the operator to see the marked data. Also, the "marks" instruct the display to add together data from contiguously marked locations to provide their sum total; such total being equivalent to the area of the data through the marked region as displayed. The actuation function could, however, be employed to invoke numerous other types of operations. For example, using a display terminal where text is being edited, the actuation function could be used to cause a deletion or modification of the text at a point located by the x, y and SCAN control functions. It should be understood that the states of the "ZOOM" and "RANGE" counters 20 and 22 as well as the start address $A_S$ will customarily be displayed to facilitate use of the apparatus of FIG. 1.

Figure 2:
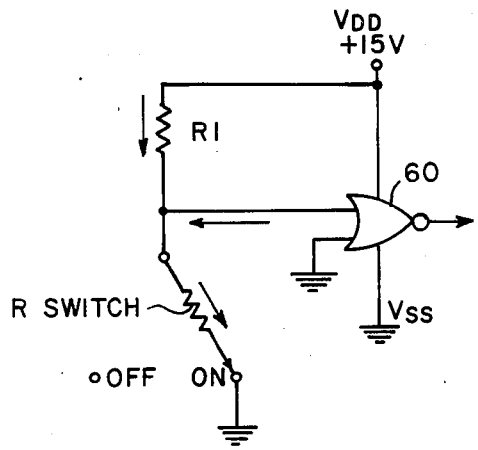
FIG. 2 schematically illustrates a preferred embodiment of a novel switch for use in the display of FIG. 1.

With reference now to FIG. 2, a preferred embodiment of a switch for use in generating the input signals to the ZOOM and RANGE counters, 20 and 22 respectively, is shown schematically. To briefly summarize what has been said above, in the disclosed embodiment of the present invention the operator generates the command signals for the display control functions through use of a rotary potentiometer and a push-actuated switch mounted as a unit on a gimbal. The potentiometer wiper is rotated by shaft 40 having, on its exposed end, the control knob 24. The gimbal mounting permits shaft 40 to be moved a limited distance in any direction normal to the axis of rotation of the shaft when in its undeflected position. This movement provides the means to actuate the switches 26, 28, 30 and 32 which are placed around the shaft such that they may be actuated selectively by choosing the direction of the shaft movement. The four switches could be selected to be of the type actuated by direct contact closure, actuated magnetically such as reed switches or hall-effect switches, optically actuated switches or capacitive switches. However, in the preferred embodiment of the invention, novel "high" resistance switches have been employed. A "high" resistance switch is implemented by using conductive material to close a "high" resistance circuit to an amplifier to cause the amplifier to change its output reliably from one state to another with relatively small amounts of current flow. Thus, as the term is employed herein, a "high" resistance switch is a digital device; i.e., a device which will generate an output indicative of either an ON or OFF condition when actuated; which may be converted into an analog switch with additional circuitry.

As depicted in FIG. 2, a "high" resistance switch in accordance with the present invention employs a CMOS integrated circuit gate 60 which is operated at a dc voltage $V_{DD}$. Gate 60 may, in fact, comprise ¼ of a JAN/JEDEC B series type 4001 which requires a maximum input current, $I_{in}$, of 1 μamp at less than 4 v from $V_{DD}$ or $V_{SS}$ to switch its output from $V_{DD}$ to $V_{SS}$. The input current to gate 60 is supplied through a biasing resistor $R_1$ from source $V_{DD}$. Presuming the switch of FIG. 2 to be in the OFF position (the switch is schematically shown in FIG. 2 in the ON condition), the voltage level $V_{SS}$ will appear at the output of gate 60 since the gate functions as an invertor. In order to switch the output of gate 60 to level $V_{DD}$, it is necessary only to provide sufficient current to overcome the bias plus enough additional current to switch the output of the gate through a resistance to $V_{SS}$. In the embodiment being described, if $R_1$ is 1M ohm and $V_{DD}$ +15 volts, the requisite current to cause the gate to switch may be derived by providing a resistance between the gate input and $V_{SS}$ of 330,000 ohms or less. The foregoing may be seen from the following equation:

$$R_{SWITCH} = \frac{4v}{[(15v - 4v)/1 M\Omega] + 1 \mu A} = \frac{4v}{12 \mu A} = 333 K\Omega \quad (1)$$

It may be seen that a switch of the type shown in FIG. 2 has inherent tolerance to contact resistances which can adversely affect conventional "low" resistance switches. The switch of FIG. 2 has the further advantage that high contact pressure to insure minimum contact resistance is unnecessary and the wiping action of the contact surfaces can thus be increased, without incurring detrimental contact wear problems, to better insure switch actuation. Also, unlike conventional "low" resistance switches, contact wear due to repeated high pressure closures of metallic contacts is minimized in the switch of the present invention. The low contact pressures, which permit low switch actuation forces and minimization of contact wear, allow the stationary contacts of a FIG. 2 switch to be fabricated from thin layers of conductive material of the types commonly found on etched or plated circuit boards. The movable contacts of a switch of the present invention may also be fabricated from very thin layers of conductive material. A further unique characteristic of a "high" resistance switch of the type described above, which is taken advantage of in the display of FIG. 1, is that the mechanical geometry of the contacts is very flexible.

Figure 3:
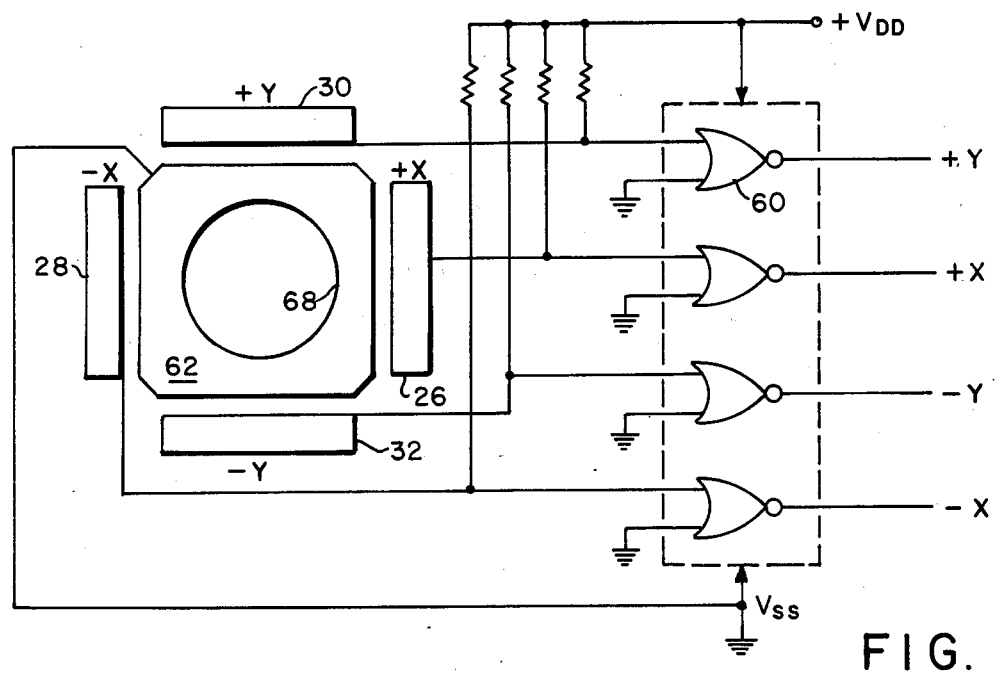
FIG. 3 comprises a schematic illustration of a portion of the single gimbal-mounted control of the display of FIG. 1, the control portion of FIG. 3 being associated with a plurality of the switches of the type depicted in FIG. 2.

Referring to FIG. 3, the stationary contacts of an array of four switches, specifically switches 26, 28, 30 and 32 of FIG. 1, are defined by means of tin plated copper areas formed on a printed circuit board 66 (see FIG. 4). In FIG. 3, the stationary contacts uniquely associated with each switch have been identified with the reference numeral of the switch while a common contact is indicated by reference numeral 62. It is to be noted that, as a result of the above-mentioned flexibility in contact geometry, each of the four switches may be provided with a pair of discrete contacts. Thus each switch may have an "ON" and an "OFF" contact thereby permitting the setting and resetting of a flip-flop for each function.

Figure 4A:
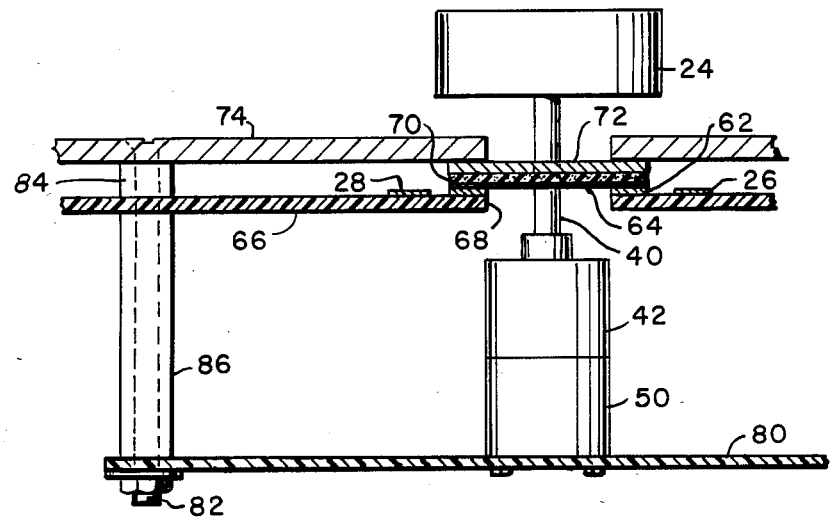
FIGS. 4a and 4b respectively show the gimbal-mounted switch assembly of the FIG. 1 embodiment in the unactuated and an actuated position, FIG. 4 being a cross-sectional side elevation view of the switch assembly.
Figure 4B:
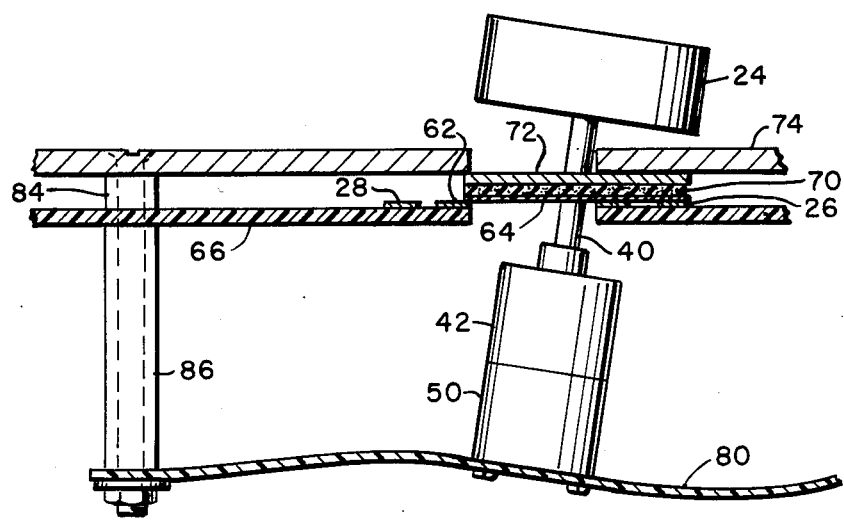

Referring to FIG. 4, the physical structure of the switch arrangement of FIG. 3, as employed in the display of FIG. 1, is shown in section. The movable contact 64, which is common for all four switches, is in the form of a conductive washer. In one embodiment of the invention, movable contact 64 was fabricated from 10 mil thickness conductive polytetrafluoroethylene with a volume resistivity in the range of 2 to 3.5 ohm/cm. The material from which washer 64 is fabricated is selected to be sufficiently thick so that warping will not occur and to have sufficient conductivity to assure adequate current flow to implement the "high" resistance switching function. The resistance of washer 64 is indicated on FIG. 2 as "$R_{SWITCH}$". Suitable conductive plastic material for washer 64 is commercially available from The Polymer Corporation, Reading, Pa. 19603. The potentiometer shaft 40 is positioned from below through a hole 68 formed in the printed circuit board 66 which supports the stationary switch contact. The conductive washer 64 is mounted on shaft 40 and rests on circuit board 66 as shown. When shaft 40 is moved off center, as shown in FIG. 4B, the conductive washer 64 will slide across the circuit board and establish a path for current flow between the common stationary contact 62 and one of the stationary contacts of switches 26, 28, 30 and 32. Thus, referring to FIG. 4B, movement of control knob 24 from the centered position as depicted in FIG. 4A to the right; i.e., in the $+x$ direction; causes the conductive washer 64 to slide to the point where it establishes a path for current flow between stationary contacts 62 and 26. The bridging of contacts 26 and 62, in turn, results in sufficient current to switch the CMOS gate 60 representing $+x$.

To provide assurance that the conductive washer 64 will make contact with the contact areas on circuit board 66, washer 64 is sandwiched with a layer of conductive plastic foam 70 and a metal washer 72 between circuit board 66 and a front panel 74. The washer 72 could be formed from any material having suitable rigidity to provide a stiff backing for the foam 70. Washer 72 seals off the hole in the front panel through which shaft 40 passes. The foam 70 is selected in thickness and density to supply sufficient force to insure mechanical contact between washer 64 and the contacts on the circuit board. The conductive plastic foam which forms element 70 in a preferred embodiment may, for example, comprise type 2900 available from 3M Company, St. Paul, Minn. The contacts on circuit board 66 are spaced so as to assure a resultant resistance maximum for the completed contact closure which is less than that necessary to switch the gates.

Figure 5:
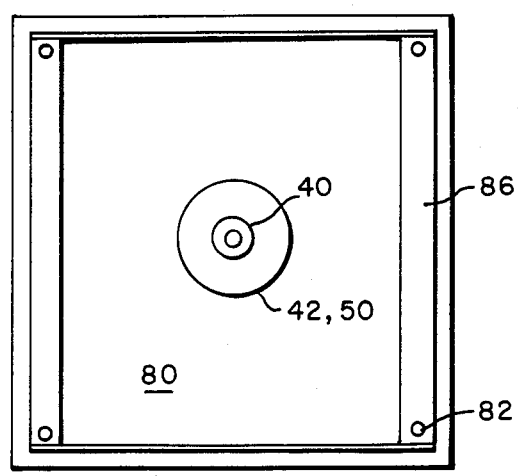
FIG. 5 is a top view of a portion of the support mechanism for the switch assembly of FIG. 4.

Referring simultaneously to FIGS. 4 and 5, the gimbal mounting of the command signal generator in accordance with a preferred embodiment of the invention is shown. As noted above, in the preferred embodiment of the present invention it is necessary that the control knob 24 and the shaft 40 on which it is mounted be free to move a short distance radially from a normally centered position. It is also necessary that a restoring force be applied to return the control knob and shaft to the normally centered position when the force used to move the control is released. The shaft 40 must also be free to rotate in either direction, so as to cause movement of the wiper arm of potentiometer 42, while the potentiometer remains stationary relative to the direction of shaft rotation. Further, shaft 40 must also be free to move axially while potentiometer 42 and switch 50 remain stationary relative to the shaft. While the gimbal mounting of the movable elements of the command signal generator could be achieved using mechanical components arraged on x-y axes with springs and/or detents to provide restoration of the axial displacement, such mechanical implementation would be complicated and expensive. Accordingly, in the present invention the command signal generator is supported, in the manner to be described below, on a sheet of resilient material.

Continuing to refer to FIGS. 4 and 5, the potentiometer 42 and switch 50 comprise a commercially available unitary assembly such as type 20M175 MOD POT available from Allen-Bradley Company, Milwaukee, Wis. This unitary potentiometer-switch assembly is affixed to a sheet 80 of material which, when flexed, will reliably return to its original shape. The material for sheet 80 is selected in composition and shape to provide the desired restoring characteristics without distorting for the environment to which it may be expected to be exposed or for aging. In one reduction to practice, sheet 80 comprises 1/16-inch-thick polypropylene available from Penn Fiber and Specialty Company, Philadelphia, Pa. as type PRO-FAX 6723. The potentiometer-switch assembly will be mounted at the center of sheet 80 and the sheet will, in turn, be fastened at four corners in a fixed relationship to circuit board 66. As shown in FIG. 4, the means for mounting sheet 80 comprise elongated bolts 82 extending from panel 74. The spacings between the panel 74 and circuit board 66 and between circuit board 66 and sheet 80 are respectively defined by means of spacers 84 and 86. Referring to FIG. 5, the spacers 86 at a pair of opposite edges of sheet 80 extend between the corners.

As should be obvious to those skilled in the art, the gimbal arrangement described above has the attributes of modest cost and enhanced life and reliability since there are no moving parts which co-act with other moving parts. Further, in the arrangement of FIGS. 4 and 5 the restoring force will be equal in all radial directions of movement and the restoring forces in opposite radial directions will always remain equal independent of any overall changes in material due to aging or temperature effects.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A display function control signal generator comprising:
    handle means comprising a shaft which is movable generally radially with respect to its axis;
    means responsive to the application of a force to said handle means in a first direction for generating first command signals;
    means responsive to the application of a force to said handle means in a second direction opposite to said first direction for generating second command signals;
    means responsive to the application of a force to said handle means in a third direction for generating third command signals;
    means responsive to the application of a force to said handle means in a fourth direction opposite to said third direction for generating fourth command signals;
    means responsive to said first and second command signals for storing a first value corresponding to the quantity of the information to be presented on a display and generating a first control signal corresponding to said first value for varying the quantity of the information to be presented on a display; and means responsive to said third and fourth command signals for storing a second value corresponding to the scale of the information to be presented on a display and generating a second control signal corresponding to said second value for varying the scale of the information to be presented on the display, wherein the format of the information to be presented on the display changes in response to the generation of said command signals.

2. The apparatus of claim 1, further comprising means responsive to the application of an axial force to said handle means in a fifth direction for generating a third control signal for altering a further characteristic of the display.

3. The apparatus of claim 1 wherein said shaft of said handle means is rotatable about its axis and wherein said apparatus further comprises means responsive to rotation of said shaft for generating third and fourth control signals for causing movement of the information on the display in either direction along a coordinate axis.

4. The apparatus of claim 1 wherein each of said command signal generating means comprising a switch means.

5. The apparatus of claim 1 wherein each of said command signal generating means comprises a high-resistance switch.

6. The apparatus of claim 3 wherein each of said command signal generating means comprises switch means operable in response to radial movement of said shaft.

7. The apparatus of claim 6 wherein each of said swtich means comprises a high-resistance switch.

8. The apparatus of claim 6 wherein said means for generating third and fourth control signals comprises:
means for sensing the direction of rotation of said shaft and generating said third control signal commensurate therewith; and
means for sensing the degree of rotation of said shaft and generating said fourth control commensurate therewith when a predetermined degree of rotation has been exceeded.

9. The apparatus of claim 8 wherein each of said switch means comprises:
logic circuit means having an input terminal and an output terminal, said logic circuit means providing either a first or second signal level at its output terminal;
means applying a bias signal to said logic circuit means input terminal to cause said logic circuit means to output said first output signal level, said bias signal applying means including a dc voltage source; and
means for varying said bias signal to cause said logic circuit means to switch to outputting said second output signal level, said bias signal varying means including a selectively establishable resistive path to a potential which differs from that of said dc voltage source, wherein said resistive path is established by radial movement of said shaft.

10. The apparatus of claim 4 wherein each of said first and second control signal generating means comprises an up/down counter responsive to said command signals.

11. The apparatus of claim 6 wherein each of said command signal generating means comprises:
gate circuit means having an input terminal, an output terminal, and first and second output states;
means applying a bias signal to said gate circuit means input terminal to cause said gate circuit means to assume said first output state, said bias signal applying means including a dc voltage source; and
means for varying said bias signal to cause said gate circuit means to switch to said second output state, said bias signal varying means including a selectively establishable resistive path to a potential which differs from that of said dc voltage source, wherein said resistive path is established by radial movement of said shaft.

12. The apparatus of claim 11 wherein each of said first and second control signal generating means comprises an up/down counter responsive to the establishment of said resistive paths.

13. The apparatus of claim 12 wherein said means for generating third and fourth control signals comprises:
means for sensing the direction of rotation of said shaft and generating said third control signal commensurate therewith; and
means for sensing the degree of rotation of said shaft and generating a fourth control signal commensurate therewith when a predetermined degree of rotation has been exceeded.

14. The apparatus of claim 13, further comprising means responsive to axial movement of said handle means for generating a fifth control signal for altering a further characteristic of the display.

15. The apparatus of claim 1 wherein said handle means further comprises:
grip means affixed to a first end of said shaft; and
flexible support means for the second end of said shaft, and flexible support means normally positioning said shaft in a central orientation and enabling radial movement of said first end of said shaft with respect to said central orientation thereof.

16. The apparatus of claim 15 wherein said flexible support means comprises:
a sheet of resilient plastic material; and
means supporting said sheet at a plurality of points spaced from said second end of said shaft.

17. The apparatus of claim 16 wherein said shaft is rotatable about its axis and wherein said apparatus further comprises means responsive to rotation of said shaft for generating third and fourth control signals for causing movement of the information on the display in either direction along a coordinate axis, said means for generating third and fourth control signals being supported on said sheet of resilient plastic material.

18. The apparatus of claim 15 wherein said command signal generating means comprises:
a common stationary contact;
first through fourth stationary switch contacts spacially displaced from said common stationary contact;
a common movable contact means mounted on said shaft for slidably engaging said stationary contacts; and
first through fourth means for generating a command signal commensurate with the bridging of said first through fourth stationary contacts respectively and said common stationary contact by said movable contact means pursuant to radial movement of said shaft.

19. The apparatus of claim 18 wherein said shaft is rotatable about its axis and wherein said apparatus further comprises means responsive to rotation of said shaft for generating third and fourth control signals for causing movement of the information on the display in either direction along a coordinate axis, said means for generating third and fourth control signals being mounted on said second end of said shaft.

20. The apparatus of claim 19 wherein said means for generating third and fourth control signals comprises:
   means for sensing the direction of rotation of said shaft and generating said third control signal commensurate therewith; and
   means for sensing the degree of rotation of said shaft and generating said fourth control signal commensurate therewith when a predetermined degree of rotation has been exceeded.

21. The apparatus of claim 20 wherein each of said means for generating a command signal commensurate with the bridging of said stationary contacts by said movable contact means comprises:
   gate means having an input terminal and an output terminal, said gate means being capable of being switched to provide either a first or second output voltage level;
   means applying a bias signal to said gate means input terminal to cause said gate means to provide said first output voltage level, said bias signal applying means including a dc voltage source; and
   means for varying said bias signal to cause said gate means to switch to said second output voltage level, said bias signal varying means including said movable contact means which selectively establishes a resistive path from said gate means input terminal to a potential which differs from that of said dc voltage source.

22. The apparatus of claim 21 wherein each of said first and second control signal generating means comprises an up/down counter responsive to the switching of a respective pair of said gate means between said first and second output voltage levels.

23. A display system comprising:
   a random access memory for storing digital data;
   a display means for displaying said stored data;
   means for generating timing signals for controlling the position of said stored data along a first axis during display;
   means for generating first analog signals commensurate with the position of said stored data along said first axis during display in response to said timing signals;
   digital to analog convertor means connected between said random access memory and said display means for converting said stored data into second analog signals, said convertor means having a variable gain whereby the amplitude of said second analog signals being displayed along said first axis may be varied along an axis transverse to said first axis;
   a control means comprising a shaft which is rotatable about its axis and radially movable;
   first switch means operatively coupled to said shaft and responsive to movement of a first end of said shaft in a first direction to generate a first command signal for proportionately increasing the amplitude of said second analog signals;
   second switch means operatively coupled to said shaft and responsive to movement of said first end of said shaft in a second direction opposite to said first direction to generate a second command signal for proportionately decreasing the amplitude of said second analog signals;
   first counter means responsive to said first and second command signals for generating an output signal commensurate with the desired gain of said convertor means;
   means for delivering the output signal of said first counter means to said convertor means to vary the gain of said convertor means;
   third switch means operatively coupled to said shaft and responsive to movement of said first end of said shaft in a third direction to generate a third command signal for reducing the quantity of stored data to be displayed along said first axis;
   fourth switch means operatively coupled to said shaft and responsive to movement of said first end of said shaft in a fourth direction opposite to said third direction to generate a fourth command signal for increasing the quantity of stored data to be displayed along said first axis;
   second counter means responsive to said third and fourth command signals for generating an output signal commensurate with the desired quantity of stored data to be displayed along said first axis;
   means responsive to rotation of said shaft for generating signals for actuating the sequential scanning of the addresses of said random access memory;
   start address signal generator means responsive to the output signal from said second counter means and to said signals for actuating sequential scanning for generating a start address signal commensurate with the memory address of the stored data to be displayed at a first end of said first axis; and
   memory address counter means responsive to said start address signal and to timing signals generated by said timing signal generating means for generating memory address signals which cause said random access memory to be sequentially addressed beginning at the memory address commensurate with said start address signal and continuing through a number of addresses commensurate with the output signal of said second counter means, wherein the digital data stored in said sequentially addressed locations is outputted to said digital to analog convertor means, and said digital to analog convertor means converts said outputted digital data into said second analog signals of said desired amplitude, and outputs said second analog signals to said display means.

24. A method for the interactive exercise of control over the display of data on a cartesian coordinate system comprising the following steps:
   changing the amplitude of the displayed data in the x direction by applying a force in the x direction to a control knob for generating a first control signal; and then
   changing the amount of data presented on the display by applying a force in the y direction to said control knob, thereby generating a second control signal.

25. The method of claim 24, further comprising the step of subsequently rotating said control knob to generate a signal for causing the displayed data to be moved intact in a direction which is a function of the direction of knob rotation.

26. The method of claim 25 wherein the rate of movement of the displayed data is a function of the degree of knob rotation.

27. In a display system having a display device, a memory for storing data at a plurality of addressable locations, and means for sequentially addressing said memory to provide data for sequential display on said display device; the improvement comprising a first counter, means responsive to the count of said first counter for controlling the number of locations of said memory that are to be sequentially addressed, and first manual control means for controlling the count of said first counter; a second counter, means responsive to the count of said second counter for controlling the proportionality between the addressed data and the amplitude of the display responsive thereto, and second manual control means for controlling the count of said second counter; and third manual control means connected to control the initial address to be sequentially addressed.

28. The display system of claim 27 wherein said display device is a cathode ray tube, said memory stores data corresponding to deflection in the x direction on said cathode ray tube, and said improvement further comprises display timing means for controlling said means for sequentially addressing said memory and for controlling the y deflection of said cathode ray tube.

29. The display system of claim 28, further comprising digital to analog convertor means for displaying the data of said memory on said cathode ray tube in analog form, said means for controlling the proportionality of the addressed data and the amplitude of the display being connected to control the output of said digital to analog convertor means.

30. The display system of claim 27 wherein said first, second and third manual control means are formed as a single manually movable element.

31. The display system of claim 30 wherein said improvement further comprises means for inhibiting change of said initial address to be sequentially addressed in response to movement of said third manual control means by less than a predetermined amount.

32. The display system of claim 27, further comprising a fourth manual control means connected to selectively intensify a predetermined portion of the display presented on said display device.

33. The display system of claim 32 wherein said first, second, third, and fourth manual control means are formed as a single manually movable element.

34. A display system including a memory for storing digital data corresponding to a plurality of lines of an image, a display device, digital to analog convertor means connected to receive digital data from said memory and output said data to said display device in the form of analog signals, scanning means for cyclically reading out items of data sequentially from said memory while scanning said display device along a first axis, whereby a pattern of a plurality of points corresponding to said data is displayed by said display device, first control means for manually controlling the gain of the output of said converter means to control the amplitude of the analog signal corresponding to the item of data to be displayed, said amplitude corresponding to the transverse distance from said first axis at which the point corresponding to said item of data will be displayed, second control means for manually controlling the number of items of data to be sequentially read out of said memory for each scan of said display device, thereby controlling the number of points of data displayed on said display device, and third control means for manually selecting the item of data in said memory correspond to the initial position along said first axis of the display of said display device.

35. The display system of claim 34 wherein said first control means comprises a first counter, means for manually controlling the count in said first counter, and means for controlling the gain of said digital to analog converter means as a function of the count of said first counter.

36. The display system of claim 35 wherein said digital memory comprises an addressable memory, said scanning means comprises means for scanning said display device at a predetermined repetition rate, and said second control means comprises a second counter means for manually controlling the count in said second counter, and means for controlling the number of items of data to be read out of said memory as a function of the count of said second counter.

* * * * *

UNITED STATES PATENT AND TRADEMARK OFFICE
CERTIFICATE OF CORRECTION

PATENT NO. : 4,794,388
DATED : December 27, 1988
INVENTOR(S) : Henry G. Matthews It is certified that error appears in the above-identified patent and that said Letters Patent is hereby corrected as shown below:

Column 3, line 57, change "enclosure" to --closure--.

Column 13, line 22, change "comprising" to --comprises--.

Column 14, line 33, change "and" to --said--.

Signed and Sealed this

Twenty-ninth Day of September, 1992

Attest:

DOUGLAS B. COMER

Attesting Officer     Acting Commissioner of Patents and Trademarks